Sept. 14, 1943.　　　　L. C. HITCH　　　　2,329,372
POWER LAWN MOWER
Filed Aug. 5, 1940
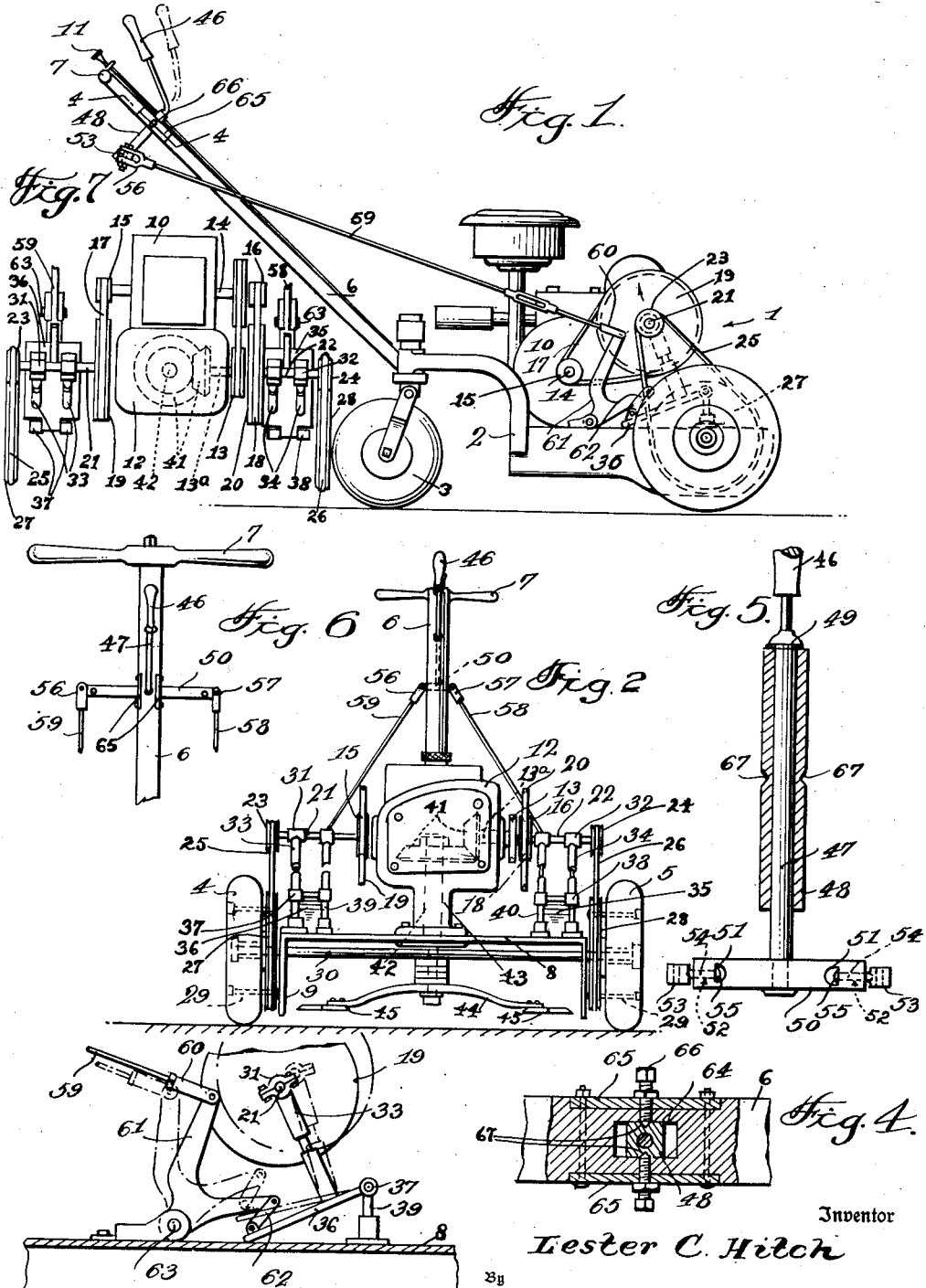
Inventor
Lester C. Hitch
By
Mann, Anderson & Liddy
Attorney Patented Sept. 14, 1943

2,329,372

UNITED STATES PATENT OFFICE 2,329,372

POWER LAWN MOWER

Lester C. Hitch, Maryville, Tenn.

Application August 5, 1940, Serial No. 351,507

3 Claims. (Cl. 56—25.4)

This invention relates to improvements in power lawn mowers, a particular purpose being to provide a mechanism whereby the steering is easily controlled. As is commonly known, a power lawn mower comprises a fairly heavy machine which requires more than ordinary effort in its steering, certainly more than should be required of the operator when going over a large area of grass. With this brief preamble in mind the objects of the invention are as follow:

First, to provide a power lawn mower having embodied therein a mechanism for easily accomplishing its steering while traversing a grassy area.

Second, to provide a power lawn mower wherein the driving motor is subject to such regulation through the medium of a steering handle located adjacently to the hand hold, that the traction wheels are either rendered tight or loose, so to speak, and thus made to steer the machine right or left or to cause its motion in a straight forward direction.

Third, to provide a power lawn mower which embodies a novel type of rotary cutter, this being driven in common from the motor which, as stated before, is subject to regulation in accomplishing the steering.

Other objects and advantages will appear in the following specification, reference being had to the accompanying drawing, in which:

Figure 1 is a side elevation of the improved lawn mower, particularly illustrating the steering mechanism.

Figure 2 is a front elevation of the structure in Fig. 1.

Figure 3 is a detailed view of a portion of the steering mechanism illustrating the action of one of the traction driving sheaves.

Figure 4 is a detailed horizontal section taken on the line 4—4 of Fig. 1.

Figure 5 is a detailed view of the steering handle, a portion being shown in section.

Figure 6 is a detailed plan view of the hand hold end of the mower bar, illustrating the method of control of the steering mechanism.

Figure 7 is a top plan view of the mower, particularly showing the details of the drive.

In carrying out the invention the lawn mower I is made to comprise a frame 2 which carries at least one caster wheel 3 at the back and a pair of traction wheels 4, 5 at the front. The frame 2 has a handle bar 6 affixed to it, said bar extending upwardly to an altitude of convenient access to the operator, where it is equipped with a hand hold 7 as in any ordinary lawn mower.

A bed plate 8 is included in the frame 2, being fixedly embodied therein in any convenient way. The side terminals of the bed plate are bent down at 9 to constitute guards. A motor 10 is mounted on the bed plate. This is of any ordinary gasoline power type, and while it is thought unnecessary to describe it in detail yet mention is made of a throttle control 11 (Fig. 1) which is located adjacent to the hand hold 7 for convenient manipulation.

Mounted on the bed plate 8 in front of the motor 10 is a gear housing 12 which carries an exposed sheave 13 driven from the shaft 14 of the motor 10. Said shaft carries pulleys 15, 16, which are belted at 17, 18 to sheaves 19, 20 on the respective ones of a pair of jack shafts 21, 22. At their ends these jack shafts carry pulleys 23, 24, which are belted at 25, 26 to the sheaves 27, 28 of the traction wheels 4, 5.

Said sheaves 27, 28 are rigidly affixed by bolts 29 to the respective traction wheels. These traction wheels run free and independently of each other on roller bearings (not shown) on the ends of an axle 30 (Fig. 2) which is appropriately supported by the frame 2. Reverting to the jack shafts 21, 22 it is to be observed that these are journalled in bearings 31, 32 at the heads of standards 33, 34, which are mounted on plates 35, 36. These plates, in turn, are pivoted at 37, 38 to standards 39, 40 affixed to the bed plate 8.

From this description it is apparent that the jack shafts 21, 22, and their accessories, are mounted for independent movement in vertical planes. This movement is utilized in controlling the steering, and since the sheaves 19, 20 respond directly to the motor 10 the latter, in a sense, is subject to control by the steering mechanism which constitutes an essential part of this invention.

Prior to going into the details of the latter, it is desired to point out that the sheave 13 is mounted on a shaft 13a (Fig. 2) which drives a gearing 41 inside of the housing 12, and, in turn, an upright cutter shaft 42 which is suitably supported by bearings in a standard 43 also mounted on the bed plate 8. Said shaft carries an arm 44 which is revoluble in the horizontal plane, and since it has cutting blades 45 riveted to its extremities, it is readily seen that the cutting of the grass is accomplished by motion of the rotary cutter.

Now with reference to the steering mechanism, a steering handle 46 is mounted on the bar 6 close to the top. Said handle is part of a bent stem 47 (Fig. 5) which, because of being bent is subject to a crank motion as depicted in Fig. 6. It is turnably carried by a sleeve 48 which is square in cross section. The stem is shouldered at 49 so that it will not slip down.

At its bottom end it carries a cross bar 50 with holes 51 adjacent to each end and bores 52 which extend out from the holes to the ends. Swivel members 53 are connected to the cross bar 50 by introducing their shanks 54 into the bores, then upsetting their ends at 55 in the holes 51 to complete the swivel connection. The clevises 56, 57 (Fig. 6) are bolted through the swivel members 53, said clevises being at the upper ends of reach rods 58, 59, which extend down toward the plates 35, 36, where they have similar clevises such as 60 for connection to a pair of bell cranks such as shown in one instance at 61 (Fig. 3).

Since the arrangement on each side is the same it will be readily understood how each of the plates 35, 36 is subject to rocking when it is explained that the bell crank 61 has a link connection 62 to the free end of the respective plate. The bell crank itself is pivoted at 63 to the bed plate.

With respect to the steering handle, it is observed in Fig. 4 that the sleeve 48 occupies a rectangular opening 64 in the bar 6. Said bar is recessed for the inletting of side metal plates 65, each of which carries a set screw 66 with an appropriate lock nut, the points of the set screws occupying oppositely located depressions 67 in the sleeve 48 so that the latter is mounted for rocking forwardly and backwardly as suggested in Fig. 1.

The operation is readily understood. By pushing the steering handle 46 straight forward both traction wheels 4, 5 are engaged and made to drive the mower in the corresponding direction. At this point it is desired to state that the driving of the rotary cutter 44, 45 has nothing to do with the control of the traction wheels. The former is driven continuously through the gearing 41 in the housing 12, but the traction wheels are subject to a variable control.

When the handle 46 is moved straight back (full lines Fig. 1) both traction wheels driving belts are rendered loose. By rocking the handle either to the right or left (Fig. 6) the mower is steered off in one or the other direction. For instance, by rocking said handle to the right, the right traction wheel 4 is loosened while the left traction wheel 5 continues to pull thus causing the mower to go off to the right. Upon releasing the handle 46 from any position into which it is manually moved said handle returns to its original position. From this it will be understood that said handle is not retained in any adjusted driving position, excepting by the pressure of the hand which moves it.

I claim:

1. In a power lawn mower, a frame, a driving motor on the frame, a pair of independently revoluble traction wheels supporting the frame, each wheel having a sheave affixed thereto, a plate pivotally mounted on the frame adjacent each wheel, a jack shaft carried by each plate, each shaft having independent pulley and belt connections with a juxtapositioned wheel sheave and with the motor, and means for variably swinging the plates for moving the jack shafts towards or away from their respective wheel sheaves so as to loosen or tighten the respective belt connections between the associated pulley and wheel sheave and thereby vary the driving power between the motor and the wheels for steering the mower.

2. In a power lawn mower, a frame, a driving motor on the frame, a pair of independently revoluble traction wheels supporting the frame, each wheel having a sheave affixed thereto, a plate pivotally mounted at one end on the frame adjacent each wheel, a jack shaft carried by each plate, each shaft having independent pulley and belt connections with a juxtapositioned wheel sheave and with the motor, and means for variably swinging the plates for moving the jack shafts towards or away from their respective wheel sheaves including a handle rigid with the frame, a cross bar pivoted intermediate its ends on the handle, a bell crank rockably mounted adjacent each plate, a link connecting the free end of the adjacently disposed plate with the free end of one arm of the associated bell crank a second link at each side of the handle connecting the free end of the other arm of each bellcrank with an end of the cross bar and means for rocking the cross bar for alternately raising or lowering the plate for alternately loosening or tightening the respective belt connections between the associated pulley and wheel sheave thereby to vary the driving power between the motor and the wheels for steering said motor.

3. In a power lawn mower, a frame, a driving motor on the frame, a pair of independently revoluble traction wheels supporting the frame, each wheel having a sheave affixed thereto, a plate pivotally mounted on the frame adjacent each wheel, a jack shaft carried by each plate, a pair of pulleys rigid with each shaft, a belt connection between one pulley of each pair and an associated wheel sheave, operative connection between the other pulley of each pair and the motor and selective means for alternately raising or lowering the free ends of the pivoted plates for alternately tightening or loosening the belt connections between the respective pulleys and wheel sheaves and thereby vary the driving power between the motor and the wheels for steering the mower.

LESTER C. HITCH.